United States Patent
Voigt et al.

(10) Patent No.: US 11,074,236 B2
(45) Date of Patent: Jul. 27, 2021

(54) HIERARCHICAL INDEX INVOLVING PRIORITIZATION OF DATA CONTENT OF INTEREST

(71) Applicant: HEWLETT PACKARD ENTERPRISE DEVELOPMENT LP, Houston, TX (US)

(72) Inventors: Douglas L Voigt, Boise, ID (US); Suparna Bhattacharya, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 395 days.

(21) Appl. No.: 15/761,933

(22) PCT Filed: Nov. 19, 2015

(86) PCT No.: PCT/US2015/061672
§ 371 (c)(1),
(2) Date: Mar. 21, 2018

(87) PCT Pub. No.: WO2017/052672
PCT Pub. Date: Mar. 30, 2017

(65) Prior Publication Data
US 2018/0276263 A1    Sep. 27, 2018

(30) Foreign Application Priority Data
Sep. 24, 2015  (IN) .......................... 5110/CHE/2015

(51) Int. Cl.
*G06F 7/02*     (2006.01)
*G06F 16/00*    (2019.01)
(Continued)

(52) U.S. Cl.
CPC ........ *G06F 16/2272* (2019.01); *G06F 9/4881* (2013.01); *G06F 16/2246* (2019.01)

(58) Field of Classification Search
CPC ............ G06F 16/2246; G06F 16/2272; G06F 9/4881; G06F 16/00
See application file for complete search history.

(56) References Cited

U.S. PATENT DOCUMENTS

| 8,468,297 | B2 | 6/2013 | Bhattacharya |
| 8,675,660 | B2 | 3/2014 | Abel |

(Continued)

FOREIGN PATENT DOCUMENTS

| CN | 101021866 A | 8/2007 |
| CN | 101819596 A | 9/2010 |

(Continued)

OTHER PUBLICATIONS

Loro, Allessandra et al, "Indexing and Selecting Hierarchical Business Logic," Proceedings of the VLDB Endowment, vol. 8 No. 12, Aug. 2015. (Year: 2015).*

(Continued)

*Primary Examiner* — Bruce M Moser
(74) *Attorney, Agent, or Firm* — Trop, Pruner & Hu, P.C.

(57) ABSTRACT

An example implementation may relate to an apparatus that may identify data content of interest from data in buffers, and may store index entries representing the identified data content in a hierarchical index having different performance levels. The apparatus may include a priority manager that maintains an index scoreboard that tracks where index entries are to be stored among the different performance levels of the hierarchical index based on predetermined polices that prioritize data content of interest or functions that use data content of interest.

19 Claims, 7 Drawing Sheets

(51) Int. Cl.
  *G06F 16/22*  (2019.01)
  *G06F 9/48*  (2006.01)

(56) References Cited

U.S. PATENT DOCUMENTS

| | | |
|---|---|---|
| 8,972,465 B1 | 3/2015 | Faibish |
| 9,176,888 B2 * | 11/2015 | Martin ............... G06F 12/1036 |
| 2005/0193005 A1 | 9/2005 | Gates et al. |
| 2009/0187731 A1 | 7/2009 | Deutschle et al. |
| 2011/0137889 A1 | 6/2011 | Nayberg |
| 2013/0159364 A1 | 6/2013 | Grider et al. |
| 2013/0232306 A1 | 9/2013 | Dhuse et al. |
| 2015/0019531 A1 | 1/2015 | Bursey |
| 2016/0283538 A1 * | 9/2016 | Barber ............... G06F 16/2255 |

FOREIGN PATENT DOCUMENTS

| | | |
|---|---|---|
| EP | 1169710 | 1/2002 |
| WO | WO-2014074487 | 5/2014 |

OTHER PUBLICATIONS

International Search Report & Written Opinion received in PCT Application No. PCT/US2015/061672, dated Jul. 29, 2016, 13 pages.
Soni, M. et al., "FPGA Implementation of Content Addressable Memory Based Information Detection System," Feb. 2015, 3 pages, http://www.ijarcce.com/upload/2015/february-15/IJARCCE6G.pdf.

* cited by examiner

| KEY | VALUE | FUNCTION | RECENT ACCESS | INDEX POLICY |
|---|---|---|---|---|
| Object:1 | Result:Image2 | Image2 Recognizer | FALSE | LRU Short |
| Object:1 | Accesses:15 | Statistics | FALSE | LRU Short |
| Object:2 | Result:Click Log | Clickstream Analyzer | FALSE | Keep High |
| Object:2 | Accesses:4 | Statistics | FALSE | Keep High |
| Object:3 | Result:Text1 | Text1 Recognizer | FALSE | LRU Medium |
| Object:3 | Result:Image1 | Image1 Recognizer | FALSE | LRU Medium |
| Object:3 | Accesses:100 | Statistics | TRUE | LRU Medium |
| Object:4 | Result:Text1 | Text1 Recognizer | TRUE | LRU Medium |
| Object:4 | Result:Image1 | Image1 Recognizer | TRUE | LRU Medium |
| Object:4 | Accesses:1 | Statistics | TRUE | LRU Medium |
| Result:Image1 | Place:Image1+Text1 = Top | Placement Engine | TRUE | LRU Long |
| Result:Text1 | Place:Image1+Text1 = Top | Placement Engine | TRUE | LRU Long |
| Result:Click Log | Place:Click Log = Top | Placement Engine | FALSE | Keep High |
| Result:Video | Place:Video = Stream | Placement Engine | FALSE | LRU Short |

FIG. 7

HIERARCHICAL INDEX INVOLVING PRIORITIZATION OF DATA CONTENT OF INTEREST

BACKGROUND

Real time analytics may involve performing analytic processes, such as content recognition, on data as the data is being stored. The data may be temporarily buffered en route to being stored, to facilitate analysis by the analytic processes. When buffers fill, real time analytic processes may be transferred to background processing.

BRIEF DESCRIPTION OF THE DRAWINGS

Various examples will be described below with reference to the following figures.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index may refer generally to any of those elements.

DETAILED DESCRIPTION

A real time analytics system may involve executing analytic processes on data of a data stream. In some cases, as data enters the system, the data may be buffered temporarily in data buffers prior to storage to allow the analytic processes to operate on the data. An example of an analytic process may include a content recognizer designed to search or monitor for certain patterns of interest in data. An analytic process may output a result that is stored in indices, such as content addressable memory or random access memory. When the data buffers fill, the analytic processes may be relegated to background processing and may degrade or frustrate the real time nature of the analytics system.

The systems and techniques of the present description may, in some example implementations, identify data content of interest from data in the buffers by way of analytic processes and may store index entries representing the identified data content in a hierarchical index having indices of different performance levels. Additionally, a priority manager may maintain an index scoreboard that tracks where index entries are to be stored among the different performance levels of the hierarchical index based on predetermined polices that prioritize data content of interest or functions that use data content of interest. The priority manager also may maintain a buffer scoreboard that tracks buffer priorities based on the highest priority analytic process that has not yet executed against each respective buffer, and the buffer scoreboard may in turn be used to approve data eviction from the buffers.

Accordingly, the systems and techniques of the present description may be useful for using data content identified or detected in the data stream to bias data placement in storage and index entry placement in an index, among other things. For example, data having popular or high value data content of interest, as deemed by a user or by machine learning, may be placed in a high performance storage tier or index for fast subsequent access. Additionally, owing at least in part to a buffer scoreboard as described herein, buffers may be recycled according to buffer priorities when insufficient buffers are available to receive new data.

Figure 1:
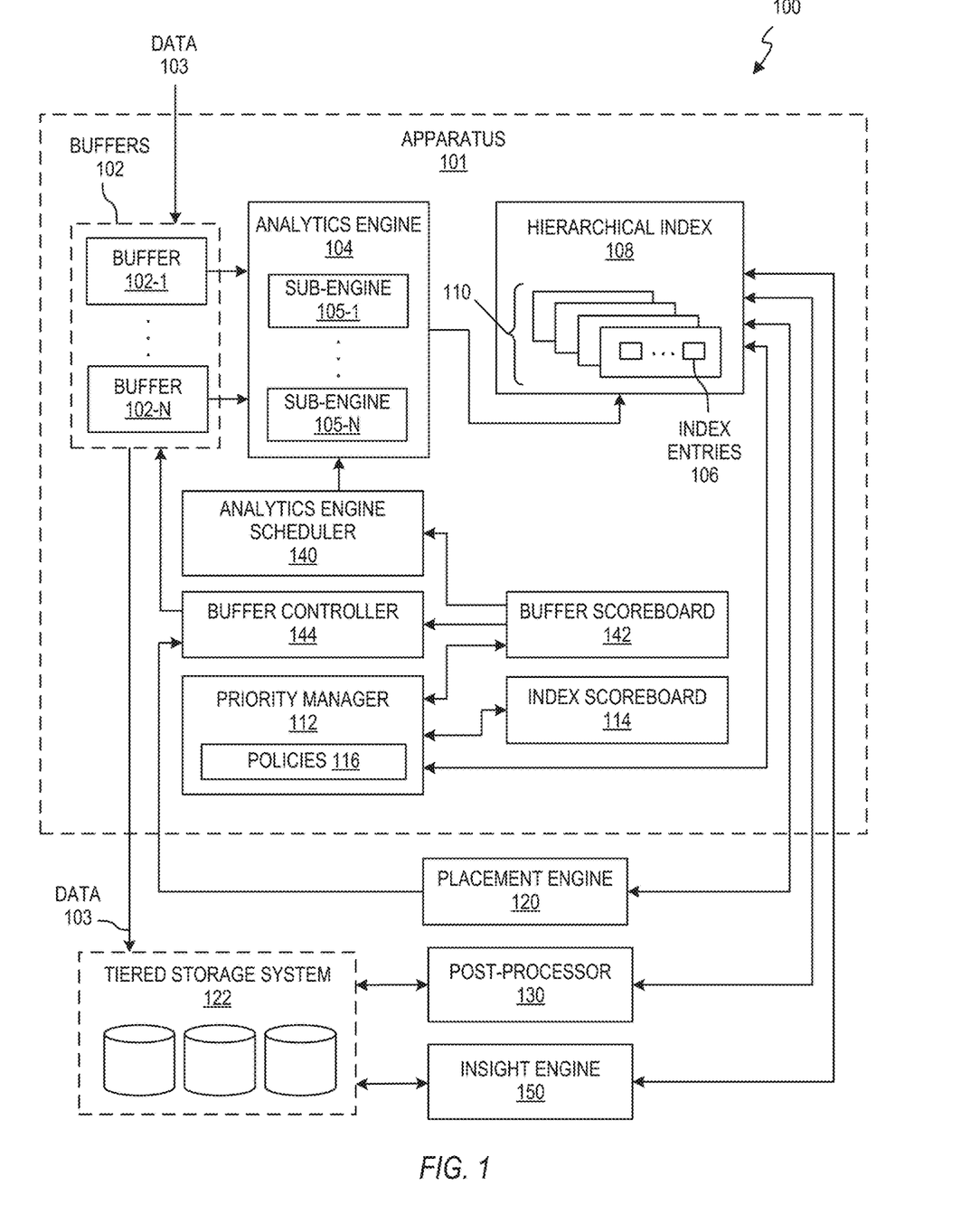
FIG. 1 is a block diagram that depicts an example system to store index entries representing data content of interest in a hierarchical index, according to an implementation.

Referring now to the figures, FIG. 1 is a block diagram of an example system 100. As will be described further herein, the system 100 may be useful for processing incoming data in real time (or near real time) to detect certain data content of interest that may guide real time (or near real time) decisions about what to do with the data. Subsequently, the system 100 may move the data to storage for further processing.

As used herein, the phrase "data content of interest" may refer to a particular pattern, characteristic, feature, etc. in the data. In some examples, a particular pattern, characteristic, feature, etc. may be deemed data content of interest by a user, based on the user's knowledge that such data content of interest may be linked to an analytic insight the user desires to extract or draw from the data. In some examples, the system 100 may dynamically establish new data content of interest based on machine learning or data mining.

In some implementations, the system 100 may be a computing system, such as a server, a desktop computer, a workstation, a laptop computer, a distributed computing system, a cloud computing system, a storage system (e.g., of a storage area network), etc. The system 100 may include an apparatus 101, which may be deemed a sub-system of the system 100 in some cases.

The apparatus 101 may include buffers 102-1 through 102-N (referred to generally or collectively as buffers 102) to receive data 103. Data 103 may be part of a data stream that includes plural sets of data 103, arriving at the buffers 102 over the course of time. Each of the buffers 102-1 through 102-N may receive a different set of data 103 from the data stream. A buffer controller 144 may control the flow of data to the buffers 102 (e.g., input/output control).

The apparatus 101 also may include an analytics engine 104, a priority manager 112, and an analytics engine scheduler 140. In some implementations, the analytics engine 104 may include a plurality of analytics sub-engines 105-1 through 105-N (referred to generally or collectively as analytics sub-engines 105 or sub-engines 105). The apparatus 101 also may include a hierarchical index 108 for storing index entries 106 that may be used by various functions of the system 100, as will be described herein.

The apparatus 101 also may include an index scoreboard 114 and a buffer scoreboard 142, each of which may be used, for example, by the priority manager 112 to manage behavior of the buffers 102, the analytics engine 104, or the hierarchical index 108, in relation to data content of interest, as will be described herein. In some implementations, the index scoreboard 114 and the buffer scoreboard 142 may be implemented as, for example, a database, a table, or other kinds of structured data set.

The system 100 may also include a placement engine 120, a post-processor 130, an insight engine 150, or any combination of the foregoing. In some cases, the placement engine 120, the post-processor 130, or the insight engine 150 may be deemed "functions that use data content of interest," by virtue of their respective functionality being influenced by or related to data content of interest.

Additionally, the system 100 may include a storage device, such as, a tiered storage system 122, for storing data 103. For example, the tiered storage system 122 may be to store data 103 released from the buffers 102.

In other implementations, some of the foregoing components described as included in the apparatus 101 may be instead included in system 100, outside of the apparatus 101 (e.g., in a different sub-system of system 100). In other implementations, some of the foregoing components described as being included in system 100 may be included more particularly in apparatus 101.

The analytics engine 104, the analytics sub-engines 105, the priority manager 112, the placement engine 120, the post-processor 130, the analytics engine scheduler 140, and the insight engine 150 may each include a series of instructions encoded on a machine readable storage medium and executable by a processor or processors (e.g., a microprocessor, an application specific integrated circuit (ASIC), a field programmable gate array (FPGA), and/or other hardware device suitable for retrieval and/or execution of instructions), and additionally or alternatively, may include one or more hardware devices including electronic circuitry or logic for implementing functionality described herein. The foregoing elements of the system 100 will now be described in greater detail.

The buffers 102 may be, for example, random access memory (RAM) coupled to a processor of the system 100 (or apparatus 101), or special purpose buffers within an ASIC or an FPGA of the system 100 (or apparatus 101). In some examples, the format of data 103 may be block, file, or object. In some implementations, the buffers 102 may release presently held data 103 to the tiered storage system 122 by way of the placement engine 120, as will be described below, and the buffers 102 may subsequently receive new data 103.

The hierarchical index 108 may have or may be made up of different performance levels 110. In some implementations, the different performance levels 110 may be differentiated based on speed-related performance, particularly access speed or search speed. In some implementations, the different performance levels 110 may be indices (or indexing components) having different performance capabilities. For example, the different performance levels 110 may include a high performance level index and a low performance level index and a spectrum of indices there between. To illustrate, the different performance levels 110 may include, in order of descending performance, content addressable memory (CAM), random access memory (e.g., non-volatile or volatile memory), and storage (e.g., a hard disk drive, a solid state drive, a disk array, etc.). In another illustration, the different performance levels 110 may be classified by a hardware-software paradigm, including, for example, higher performance hardware-based indexing (e.g., CAM or a pattern matching hardware accelerator that uses memory-side acceleration, co-processor(s), an ASIC, an FPGA, a graphics processing unit, sorting networks, etc.) and lower performance software-based indexing (e.g., a B-Tree).

The hierarchical index 108 may store various types of index entries 106 (e.g., indexed data in the form of key-value pairs), such as results from the analytics engine 104, results from the post-processor 130, or placement rules used by the placement engine 120. As will be discussed below with respect to the priority manager 112, the index entries 106 may be placed in a performance level of the hierarchical index 108, either in a first instance (e.g., by the analytics engine 104) or by moving from another performance level, based on the index scoreboard 114 maintained by the priority manager 112.

In some implementations, the apparatus 101 may include multiple hierarchical indices 108. Similar performance levels in respective hierarchical indices may be deemed peer indices. Additionally, constituent indices of the multiple hierarchical indices (e.g., the different performance levels 110) may be used to segregate data, such as index entries, based on type, content, etc. of the data. For example, results of the analytics engine 104 may be stored in one of the constituent indices and placement rules may be placed in another one of the constituent indices.

The tiered storage system 122 may have or may be made up of different tiers (or portions) that are differentiated by an attribute, such as performance (e.g., performance based on access speed), price, capacity, functionality, reliability, etc. For example, the different tiers may correspond to different types of storage devices, storage media, or storage technology constituting the tiered storage system 122. To illustrate, tiers of the storage system 122 may include, from higher to lower performance (e.g., data access speed): persistent memory, a solid state drive (SSD), a hard disk drive (HDD), and a tape library. In some implementations, a tier of performance may correspond to a type of data to be stored therein, such as a video streaming tier suitable or optimal for streaming video data.

The analytics engine 104 may identify data content of interest from data 103 in the buffers 102. For example, the analytics engine 104 may perform any number or variety of data analysis or data processing tasks on the data 103 in each of the buffers 102, to identify therein (or detect, isolate, extract, etc.) data content of interest. In some implementations, the analytics engine 104 may be designed by a user (e.g., encoded to detect specific data content of interest) based on the user's knowledge that such data content of interest may be linked to an analytic insight the user desires. In some cases, because data 103 may be part of a data stream temporarily held in the buffers 102, analysis of the data 103 by the analytics engine 104 may be deemed a real time (or near real time) process.

In examples where the analytics engine 104 includes a plurality of analytics sub-engines 105, each of the analytics sub-engines 105 may similarly perform different data analysis or data processing tasks on data 103 in a buffer 102, such as searching for or detecting different data content of interest from data 103 in a buffer 102. In some implementations, at least some of the analytics sub-engines 105 may be prioritized, that is, some analytics sub-engines 105 may be deemed to have greater priority or importance by the user in view of the analytic insight the user desires. In some implementations, prioritization of the analytics sub-engines 105 may be dynamically adjusted during operation, as will be described below with respect to the analytics engine scheduler 140. The priority of the analytics sub-engines 105 may be programmable in the analytics engine 104.

The process whereby the analytics engine 104 or an analytics sub-engine 105 performs a data analysis or data processing task on data 103 in a buffer 102 may also be referred to as "executing" or "execution of" the analytics engine 104 or the analytics sub-engine 105 against data 103 in the buffer 102, or more generally, against the buffer 102. The analytics engine 104 or sub-engines 105 may generate a result after executing against a buffer 102. Additionally, the analytics engine 104 or sub-engines 105 may accumulate execution statistics, such as a count of how many times data content of interest has been successfully identified, which may indicate a popularity of that data content of interest or the corresponding analysis task or engine.

Some example implementations of analytics engine 104 or sub-engines 105 will now be discussed. It should be understood that such implementations are by way of illustration only, and other types of analytics engines may be employed, depending for example on the analytic insight a user desires to extract from the data stream. For example, in some implementations, the analytics engine 104 or a sub-engine 105 thereof may include a content recognizer that searches for or monitors for a particular content pattern or patterns in the data 103 held in the buffers 102. A content recognizer may be encoded with the content pattern(s) for which it searches, and the content pattern(s) may be related to, for example, text, images, or video. To illustrate, a text-based content recognizer may search for particular keywords, signatures, sentiments, form fields, or other text associated with a nature or characteristic of the data or other insight about the data. An image content recognizer may search for particular graphical content (e.g., pictures of a certain object). A video content recognizer may search for particular graphical content or motion patterns, for example. A result generated by a content recognizer may include a positive indication that a particular content pattern was recognized.

In some examples, a user may design the content recognizer to have a certain encoded content pattern, because the user is interested in extracting a certain insight from the data stream. For example, a user that is interested in current trends about food (e.g., restaurants, recipes, etc.) may design content recognizers to recognize images of food and text indicating positive and/or negative comments about food, and such content recognizers may be applied, for example, to data derived from social networks, blogs, and the like.

In some examples, the analytics engine 104 or analytics sub-engines 105 thereof may include a clickstream analyzer, which may track mouse clicks, webpage or web asset accesses, etc. to provide insight into how people are interacting with a website. Results generated by a clickstream analyzer may include, for example, a number of accesses, a click log, and other web statistics.

Returning again to the analytics engine 104 in general, upon identification of data content of interest from data 103 in the buffers 102, the analytics engine 104 may output and store, in the hierarchical index 108, a result as an index entry or entries 106 related to or representing the identified data content of interest. Execution statistics of the analytics engine 104 also may be stored as index entries 106. More particularly, an index entry 106 may be stored in a performance level of the hierarchical index 108 based on the index scoreboard 114, as will be described further below with respect to the priority manager 112. In examples where the analytics engine 104 may include a plurality of analytics sub-engines 105, each of the analytics sub-engines similarly may store an index entry 106 in the hierarchical index 108 (or in a performance level thereof), such as an index entry 106 generated by a successful search by an analytics sub-engine 105 or from an execution statistic.

In some implementations, an index entry 106 from the analytics engine 104 may include at least a key and value pair. For example, a key of an index entry 106 may include an index entry type indicator and/or an identifier, and may be related to the origin of the index entry. The index entry type indicator may be a prefix of a key to distinguish the different types of index entries stored in the hierarchical index 108 (e.g., types including analytics engine results, post-processor results, placement rules). The value of an index entry 106 may include, for example, the result generated by the analytics engine 104 or a derivation thereof, and a value type indicator to distinguish multiple insights about the same data (e.g., the value type indicator may identify an analytics sub-engine, a data analysis task, or other function that generated the result/value).

The post-processor 130 may perform analysis on data 103 stored in the tiered storage system 122 or on index entries 106 stored in the hierarchical index 108, and more particularly, may employ any machine learning technique, data mining technique, or the like to discover patterns in the data 103 or index entries 106. Examples of techniques that may be employed by the post-processor 103 include association rule mining, statistical models, decisions trees, neural networks, hidden Markov models, etc. For example, in comparison to a content recognizer, the post-processor 130 may discover patterns without an explicit predefined notion of what to identify.

Patterns discovered by the post-processor 130 may be stored as index entries 106 in the hierarchical index 108, and more particularly, stored in a performance level of the hierarchical index 108 based on the index scoreboard 114, as will be described below. New data 103 received in the buffers 102 may subsequently be evaluated for presence of patterns previously discovered by the post-processor 130, by comparing index entries 106 generated for the new data 103 against index entries representing the discovered patterns. In some implementations, the existence of discovered patterns in data 103 may trigger other data content driven actions, such as, for example, placement rules created for the placement engine 120 based on the discovered patterns, as will also be described below.

In an example, the post-processor 130 may analyze data 103 in the tiered storage system 122 to discover a high priority combination of different data content of interest. Similarly, the post-processor 130 may analyze index entries 106 in the hierarchical index 108 to discover high priority combinations of index entries generated for the same set of data 103. For example, to discover a high priority combination, the post-processor 130 may include an association rule mining engine (implemented as, e.g., machine readable instructions or electronic circuitry) that performs at least some aspects of association rule mining. To illustrate, the association rule miner engine may calculate statistical values such as support and confidence for various combinations of different data content of interest evaluated by the analytics engine 104 (such combinations may be referred to as item sets, in association rule mining parlance) over plural sets of data 103 in the tiered storage system 122 (such plural sets of data may be referred to as transactions, in association rule mining parlance), and the association rule miner engine may deem combinations with high support and/or confidence values to be high priority combinations of data content of interest. High priority combinations may be stored as index entries 106 in the hierarchical index 108.

The insight engine 150 may perform any variety of data analysis or data processing on data stored in the tiered storage system 122 or the hierarchical index 108, as desired by a user of the system 100. The data analysis or processing included in the insight engine 150 generally may be more time intensive or computationally intensive than analysis or processing performed by the analytics engine 104, for example. In some instances, the insight engine 150 may operate on data stored in tiered storage system 122 in the background (i.e., in the background, relative to the real time processing of the analytics engine 104). The user may configure the insight engine 150 to perform analysis or processing based on a particular insight the user wishes to draw out of the data stream. In some implementations, the insight engine 150 may generate a report to summarize the findings of the analytics engine 140 as tracked by the index entries 106 in the hierarchical index 108. In some implementations, the insight engine 150 may be a security analysis platform (e.g., cybersecurity, threat management, etc.), a social network analyzer, a sentiment analyzer, etc.

An analytics engine scheduler 140 may be included in some implementations of apparatus 101 to keep track of which analytics sub-engines 105 (or tasks of the analytics engine 104) are currently executing against each of the buffers 102 and which have already executed against each of the buffers 102. The analytics engine scheduler 140 also may prioritize future execution of the analytics sub-engines 105 (or execution of plural tasks of the analytics engine 104) against each of the buffers 102. In some implementations, prioritized execution of the analytics sub-engines 105 may be based on a prioritization of the analytics sub-engines 105 that is pre-defined by a user (e.g., user defined minimum priority, maximum priority, and default priority) and/or may dynamically adjust based on success rates of the analytics sub-engines 105. As an example, adjustment of a priority of a first analytics sub-engine (e.g., 105-1) may cause a responsive adjustment (e.g., an increase or decrease) of a priority of a second analytics sub-engine (e.g., 105-2). As another example, discovery of a high priority combination of data content of interest by the post-processor 130, as described above, may cause the analytics engine scheduler 140 to adjust (e.g., increase) the priority of all analytics sub-engines 105 related to the data content of interest in the discovered combination.

In some implementations, the analytics engine scheduler 140 may sequence execution of the analytics sub-engines 105 based on the above-described prioritization of the sub-engines 105. In some implementations, the analytics engine scheduler 140 may schedule sub-engines 105 to execute in parallel.

In some implementations, the analytics engine scheduler 140 may schedule execution of the analytics sub-engines 105 based on dependencies between the sub-engines 105. For example, the analytics engine scheduler 140 may cancel execution of a scheduled analytics sub-engine (e.g., 105-1) if, for example, a result from a previously executed analytics sub-engine (e.g., 105-2) obviates execution of the scheduled analytics sub-engine (105-1). To illustrate, a result of a previously executed analytics sub-engine (e.g., 105-2) may relate to high priority data content of interest and thus automatically trigger action from other functions that use the high priority data content of interest without completing execution by remaining scheduled analytics sub-engines. In another illustration, execution of a lower priority analytics sub-engine (e.g., 105-1) may produce cumulative or redundant data to the previously executed analytics sub-engine (e.g., 105-2), and so execution of the lower priority analytics sub-engine may be canceled. In some examples, the analytics engine scheduler 140 may confirm or trigger execution of another analytics sub-engine (e.g., 105-1), particularly if a previously executed analytics sub-engine (e.g., 105-2) failed to detect corresponding content of interest.

The placement engine 120 may move data 103 from the buffers 102 to the tiered storage system 122 according to placement rules. For example, to move data 103, the placement engine 120 may transmit to the buffer controller 144 data movement commands derived from the placement rules. In some implementations, the placement rules may be related to or derived from a prioritization of data content of interest or a prioritization of functions that use data content of interest. The placement rules may inform the placement engine 120 to move data 103 from a buffer 102 to a lower or higher tier of the tiered storage system 122, based on how the data 103 relates to data content of interest or functions that use data content of interest. In some implementations, the placement rules are stored as index entries in the hierarchical index 108.

In some implementations, some placement rules, as they relate to a content-based prioritization, may be pre-defined by a user during design of the system 100. For instance, an example placement rule may hold that certain analytics sub-engines have a higher priority than other analytics sub-engines (by user design), and accordingly, data 103 may be moved from a buffer 102 to a tier of the tiered storage system 122 having performance corresponding to the highest priority analytics sub-engine that successfully identified data content of interest in that data 103. In other words, successful identification of data content of interest by a high priority analytics sub-engine may result in data storage in a high performance tier.

In some implementations, placement rules may be dynamically established by the system 100 based on data content-driven machine learning from the data 103 and/or index entries 106 such as results from the analytics engine 104. For example, the post-processor 130 may discover patterns among stored data or index entries as described above, which may trigger the system 100 (or in some implementations, the post-processor 130) to create a placement rule to move data exhibiting discovered patterns to a particular tier of the tiered storage system 122 (e.g., a highest performance tier).

In particular, in the example post-processor 130 above that discovers a high priority combination of different data content, a created placement rule may include a rule to move data 103 having a high priority combination of different data content of interest, from a buffer 102 to a high performance tier of the tiered storage system 122. A rationale for creating a high priority combination-based placement rule may be that, in some cases, the high priority combinations are selected by the post-processor 130 as predictive of data that will be accessed frequently or in the near future, by virtue of having a higher confidence value (compared to other combinations). Such frequently accessed or soon-to-be accessed data should be stored accordingly in a higher performance tier of the tiered storage system 122 for fast access. Conversely, lower confidence values may identify combinations that predict data that is unlikely to be accessed and should be stored by a default placement rule in a lower performance tier of the tiered storage system 122.

The priority manager 112 may maintain the index scoreboard 114 to track where index entries 106 are to be stored among the different performance levels 110 of the hierarchical index 108, based on predetermined polices 116 that prioritize data content of interest or functions that use data content of interest.

In some implementations, the index scoreboard 114 itself may be stored in the hierarchical index 108. Content of the index scoreboard 114 may include references to each of the index entries 106 stored and/or to be stored in the hierarchical index 108, or may include the index entries 106 themselves. Additionally, for each reference to an index entry 106, the index scoreboard 114 may include at least one of: a name of a function that generated that index entry 106, a name of a function that can use that index entry 106, an indication of how recently that index entry 106 was used, an index policy that applies to that index entry 106, and any information relied upon by the index policy. The index policy included in the index scoreboard 114 may be selected from predetermined policies 116 encoded in the priority manager 112 by a user.

In operation, the priority manager 112 may decide which level of performance of the hierarchical index 108 to store an index entry 106, by applying the index policy from the index scoreboard 114 that corresponds to the reference for that index entry 106. The priority manager 112 also may refer to other information in the index scoreboard 114 that factors into the index policy. The priority manager 112 decision regarding which level of performance of the hierarchical index 108 to store an index entry 106 may direct or control the analytics engine 104 in storing the index entry 106 in a first instance (i.e., when the index entry 106 is first generated by the analytics engine 104). The priority manager 112 decision also may direct or control the priority manager 112 itself or a controller attached to the hierarchical index 108 to move existing index entries 106 between performance levels of the hierarchical index 108.

Examples of the policies 116 may be instructions or configuration data stored on a machine readable medium of the system 100, and may include any of the following policies. In one implementation, a policy may prescribe keeping index entries 106 related to some type(s) of data content of interest in a high performance level index of the hierarchical index 108. For example, a user may design a policy that deems index entries 106 of a particular value type indicator or index entries from a particular analytics engine 104 task or sub-engine 105 to be of high priority or interest and thus to be stored in a high performance level index of hierarchical index 108.

In some implementations, one of the policies 116 may prescribe moving of demoting an index entry 106 over time to a low or next lower performance level index of the hierarchical index 108 (also referred to herein as a process of "aging" or being "aged"). In some examples, the time frame over which an index entry 106 is aged may be encoded by a user in the policies 116 or the priority manager 112. In some examples, the time frame may be long (e.g., on the order of minutes to hours), medium (e.g., on the order of seconds to minutes), or short (e.g., on the order of seconds), depending on various considerations, such as the following. In some implementations, the time frame over which an index entry 106 is moved may be proportional to the popularity of data content of interest related to that index entry 106 (e.g., as indicated by the above described execution statistics). In some implementations, the time frame over which a particular index entry 106 is aged may be longer than other index entries, if the hierarchical index 108 contains a placement rule (used by or created by placement engine 120) or a high priority combination (discovered by post-processor 130) that involves data content of interest related to that index entry 106. Additionally or alternatively, the priority manager 112 may dynamically adjust the time frame according to a performance aspect of system 100, such as, for example, memory pressure, workload, remaining capacity of the hierarchical index 108, or other aspects. Some policies also may use different time frames for different types of data content of interest or functions that use data content of interest.

In some implementations, one of the policies 116 may prescribe storing an index entry 106 in a performance level of the hierarchical index 108 that is associated with a priority of a function that uses the data content of interest related to that index entry 106 (e.g., the policy manager 112 may identify the function, based on the name of the function in the index scoreboard 114). For example, the association may be proportional, such that an index entry 106 relating to data content of interest used by a high priority function may be stored in a high performance level of the hierarchical index 108. Associations other than proportionality may be employed as well, In some implementations, one of the policies 116 may prescribe storing an index entry 106 in a performance level of the hierarchical index 108 that is commensurate with a popularity of data content of interest related to that index entry 106. For example, the popularity of data content of interest may be determined from execution statistics, which, as described above, may be a count of how many times that data content of interest has been successfully identified. More particularly, a comparison of execution statistics stored in the hierarchical index 108 may generate a relative popularity between data content of interest. To illustrate, an index entry 106 related to a popular data content of interest may be stored in a high performance level of the hierarchical index 108. In another example, the popularity may be determined from looking up, in the index scoreboard 114, the indication of how recently that index entry 106 was used, and the policy may be to keep most recently used index entries 106 in a high performance level of the hierarchical index 108 and to move least recently used index entries to a lower performance level.

By virtue of placing index entries 106 in the hierarchical index 108 based on policies 116 that are related to data content of interest, index entries that are related to high priority or important types of data content (i.e., importance as regarded or surmised by a user or by the system via machine learning, etc.) may be quickly and efficiently accessed from the higher performance levels of the hierarchical index 108.

In some implementations, the priority manager 112 also may maintain a buffer scoreboard 142 to track a buffer priority for each of the buffers 102. The buffer scoreboard 142 may be used by the buffer controller 144 to manage the buffers 102, according to an example manner described below, when there are or prior to there being insufficient free buffers 102 available to receive new data 103 (i.e., buffers 102 become full or are nearly full), which may frustrate the real time (or near real time) analysis performed by the analytics engine 104. In such a situation, the buffer controller 144 may select a buffer or buffers for data eviction, that is, to move data from the selected buffer(s) to the tiered storage system 122, even if sub-engines 105 (or analytics engine 104 tasks) scheduled by the analytics engine scheduler 140 have not executed against those selected buffer(s). The process of data eviction in this manner may also be referred to as "buffer recycling," and the associated movement of data from the buffers 102 may be coordinated by the buffer controller 144.

An example buffer scoreboard 142 may include, for each buffer 102-1 through 102-N: flags to indicate whether respective analytics sub-engines 105 have been executed against the buffer (referred to herein as "analytics engine flags" for convenience), a count of the analytics sub-engines 105 currently executing against the buffer, and a flag to indicate whether the buffer is to be recycled (also referred to herein as a "recycle flag" for convenience). The buffer scoreboard 142 may be updated as analytics sub-engines 105 are executed against the buffers 102.

As established by the priority manager 112, buffer priority for a buffer 102 may be associated with a highest priority among analytics sub-engines 105 that have not yet executed against that buffer 102 (e.g., execution as indicated by the analytics engine flags in the buffer scoreboard 142). For example, as described above with respect to the analytics engine scheduler 140, at least some of the analytics sub-engines 105 may be prioritized, based on user knowledge for example. Accordingly, in an illustration, if the buffer scoreboard 142 indicates that high priority sub-engines have finished executing against a buffer (e.g., 102-1) but low priority sub-engines have not yet executed against that buffer 102-1, the buffer priority of that buffer 102-1 may be deemed low by the priority manager 112. By contrast, in the same illustration, if the buffer scoreboard 142 indicates that high priority sub-engines 105 have not yet executed against a buffer 102-2, the buffer priority of that buffer 102-2 may be deemed high by the priority manager 112. On balance, the buffer priority of the buffer 102-2 may be higher than the buffer priority of the buffer 102-1. Buffer priorities may change as the flags of the buffer scoreboard 142 are updated. In some implementations, the priority manager 112 may maintain the buffer priorities in the buffer scoreboard 142.

In operation, the buffer controller 144 may indicate to the priority manager 112 that data eviction is imminent due to full or nearly full buffers 102, and in response, the priority manager 112 may approve data eviction for a buffer (or buffers) based on the buffer scoreboard 142, and more particularly, based on rules related to buffer priorities and the buffer scoreboard 142. In some implementations, the priority manager 112 may approve a buffer for data eviction if all of its analytics engine flags are set, thus indicating that no further analytics sub-engines 105 are scheduled to run against that buffer. In some implementations, the priority manager 112 avoids approving data eviction for buffers that have a buffer priority above a priority threshold that is configured in the priority manager 112 by the user. In some implementations, the priority manager 112 may approve a buffer for data eviction if its buffer priority is the lowest among all buffers 102. If multiple buffers have the lowest priority among all buffers 102, the priority manager 112 may break the tie by selecting the buffer with a larger number of analytics engine flags set.

In some implementations, the analytics engine scheduler 140 may check the buffer scoreboard 142 periodically, when scheduling analytics sub-engines 150, or prior to executing scheduled analytics sub-engines 150. For a buffer that is flagged for recycling according to the buffer scoreboard 142, the analytics engine scheduler 140 may cancel pending execution of any scheduled analytics sub-engines 105. In some implementations, the priority manager 112 may notify the analytics engine scheduler 140 when a buffer is flagged for recycling.

Figure 2:
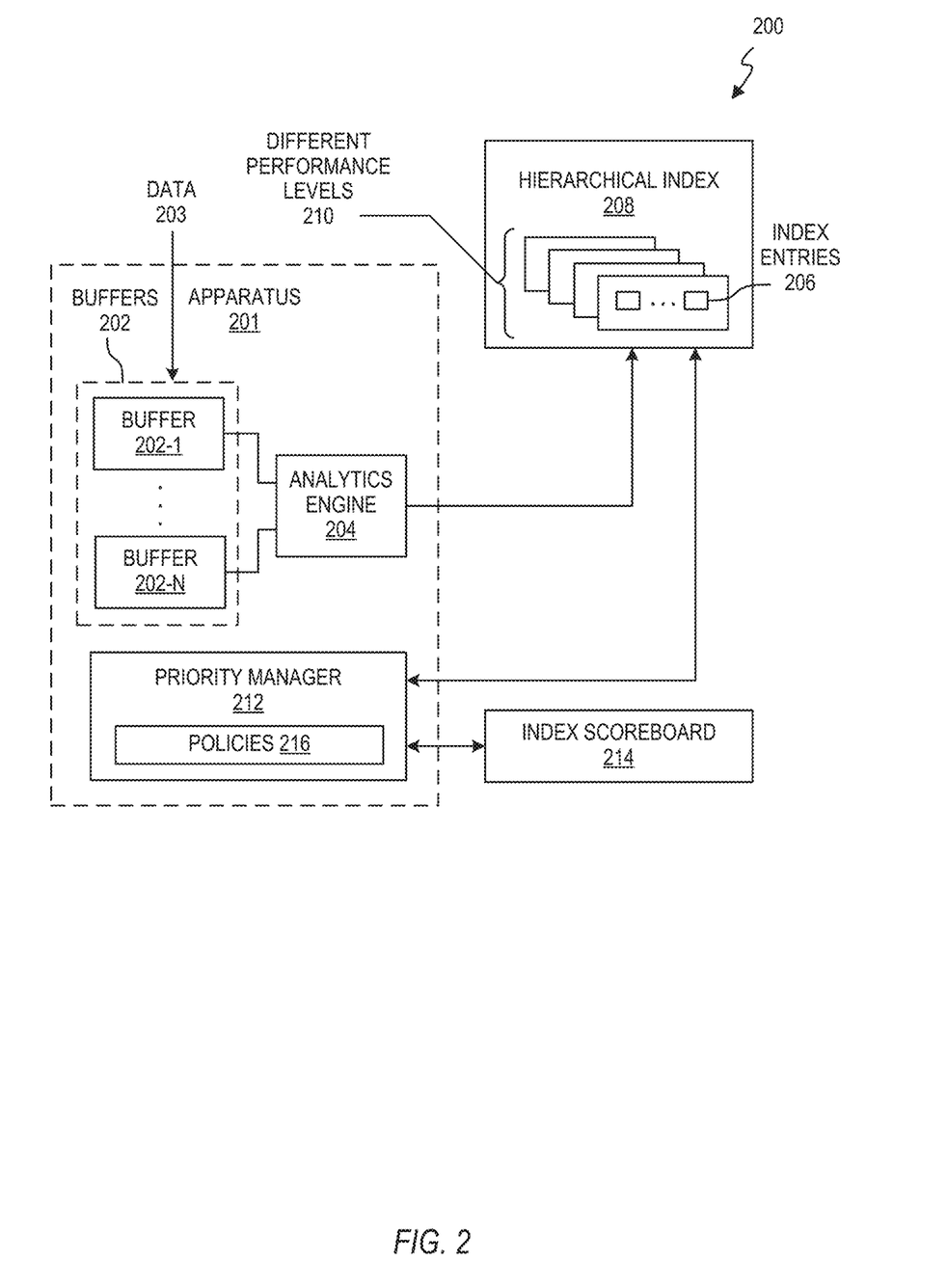
FIG. 2 is a block diagram that depicts an example system to store index entries representing data content of interest in a hierarchical index, according to another implementation.

FIG. 2 is a block diagram of an example system 200 to store index entries representing data content of interest in a hierarchical index, according to an implementation. In some implementations, the system 200 may be a computing system, such as a server, a desktop computer, a workstation, a laptop computer, a distributed computing system, a cloud computing system, etc. The system 200 may include an apparatus 201, which may be deemed a sub-system of the system 200 in some cases.

The apparatus 201 may include buffers 202 (e.g., 202-1 through 202-N), an analytics engine 204, and a priority manager 212. The buffers 202 may be analogous in many respects to the buffers 102 of FIG. 1. For example, the buffers 202 may receive incoming data 203.

The analytics engine 204 may be analogous in many respects to the analytics engine 104 of FIG. 1. The analytics engine 204 may identify data content of interest from data 203 in the buffers 202, and may store index entries 206 representing the identified data content in a hierarchical index 208 having indices of different performance levels 210. The index entries 206, the hierarchical index 208, and the indices of different performance levels 210 may be analogous in many respects to the index entries 106, the hierarchical index 108, and the different performance levels 110 of FIG. 1, respectively.

The priority manager 212 may maintain an index scoreboard 214 that tracks where index entries 206 are to be stored among the different performance levels 210 of the hierarchical index 208 based on predetermined polices 216 that prioritize data content of interest or functions that use data content of interest. The priority manager 212, the index scoreboard 214, and the predetermined policies 216 may be analogous in many respects to the priority manager 112, the index scoreboard 114, and the predetermined policies 116 of FIG. 1, respectively.

Figure 3:
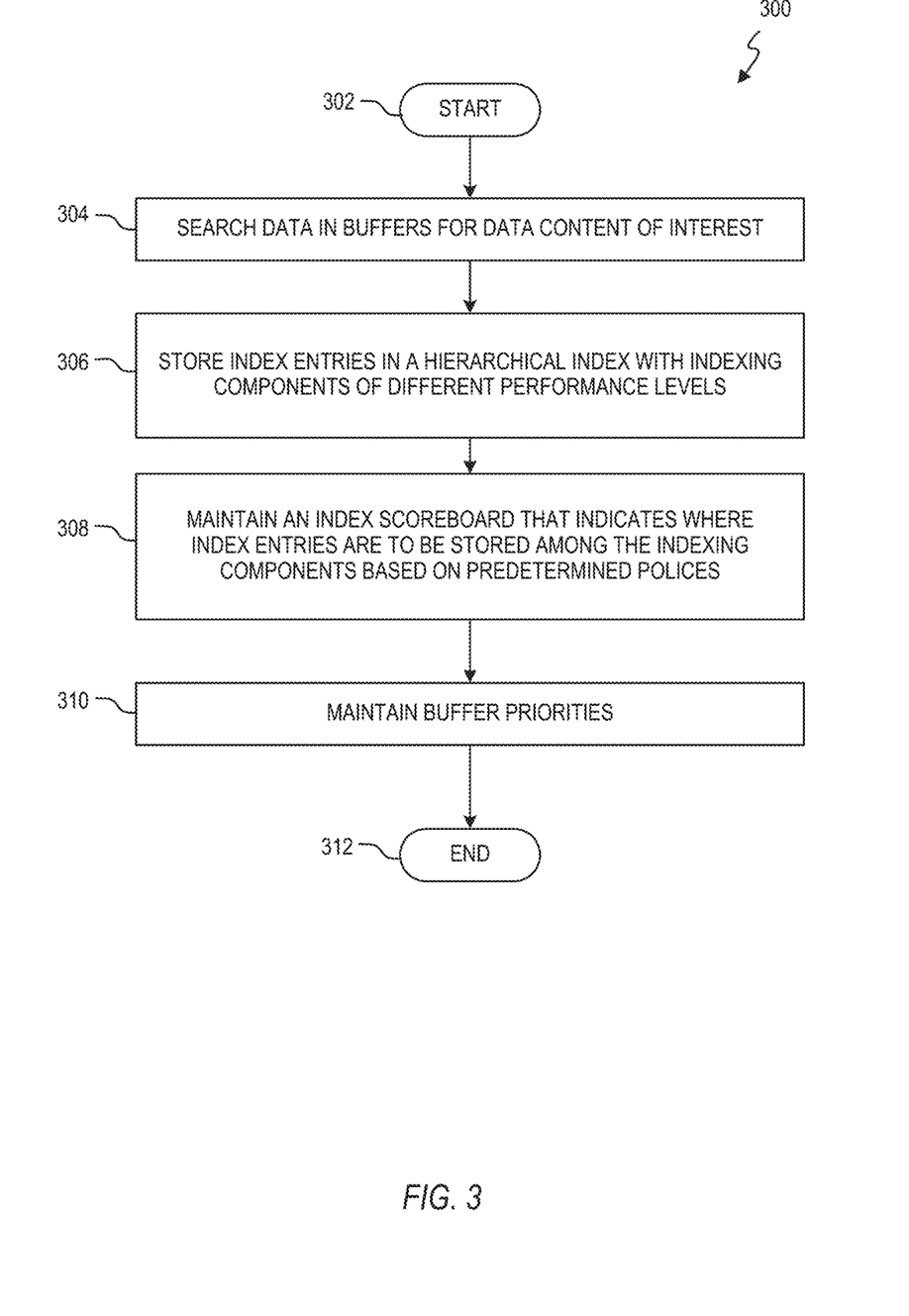
FIG. 3 is a flowchart of an example method for storing index entries in a hierarchical index, according to an implementation.

FIG. 3 is a flowchart of an example method 300 for storing index entries in a hierarchical index, according to an implementation. Method 300 may be implemented in the form of executable instructions stored on a machine readable storage medium and executed by at least one processor and/or in the form of electronic circuitry. For example, method 300 may be executed or performed by the system 100 or any components thereof (including apparatus 101). Various other suitable components and systems may be used as well, such as components of the system 200 and apparatus 201.

In some implementations of the present disclosure, one or more blocks of method 300 may be executed substantially concurrently or in a different order than shown in FIG. 3. In some implementations of the present disclosure, method 300 may include more or less blocks than are shown in FIG. 3. In some implementations, one or more of the blocks of method 300 may, at certain times, be ongoing and/or may repeat.

The method 300 may begin at block 302, and continue to block 304, where prioritized analyzers (e.g., analytics sub-engines 105) search data (e.g., 103) in buffers (e.g., 102) for data content of interest. At block 306, index entries (e.g., 106) may be stored, by the analyzers for example, in a hierarchical index (e.g., 108) with (made up of) indexing components of different performance levels (e.g., 110). The index entries (e.g., 106) may represent data content of interest identified by the searching performed at block 304.

At block 308, a priority manager (e.g., 112) may maintain an index scoreboard (e.g., 114) that indicates where index entries (e.g., 106) are to be stored among the indexing components (e.g., 110) based on predetermined polices (e.g., 116) that involve prioritization of data content of interest or functions that use data content of interest.

At block 310, the priority manager (e.g., 112) may maintain buffer priorities, each of the buffer priorities being proportional to a highest priority among analyzers (e.g., 105) that have not yet searched a corresponding buffer (e.g., 102) for data content of interest. The buffer priorities may be useful in coordinating buffer recycling or data eviction. The method 300 may end at block 312.

Figure 4:
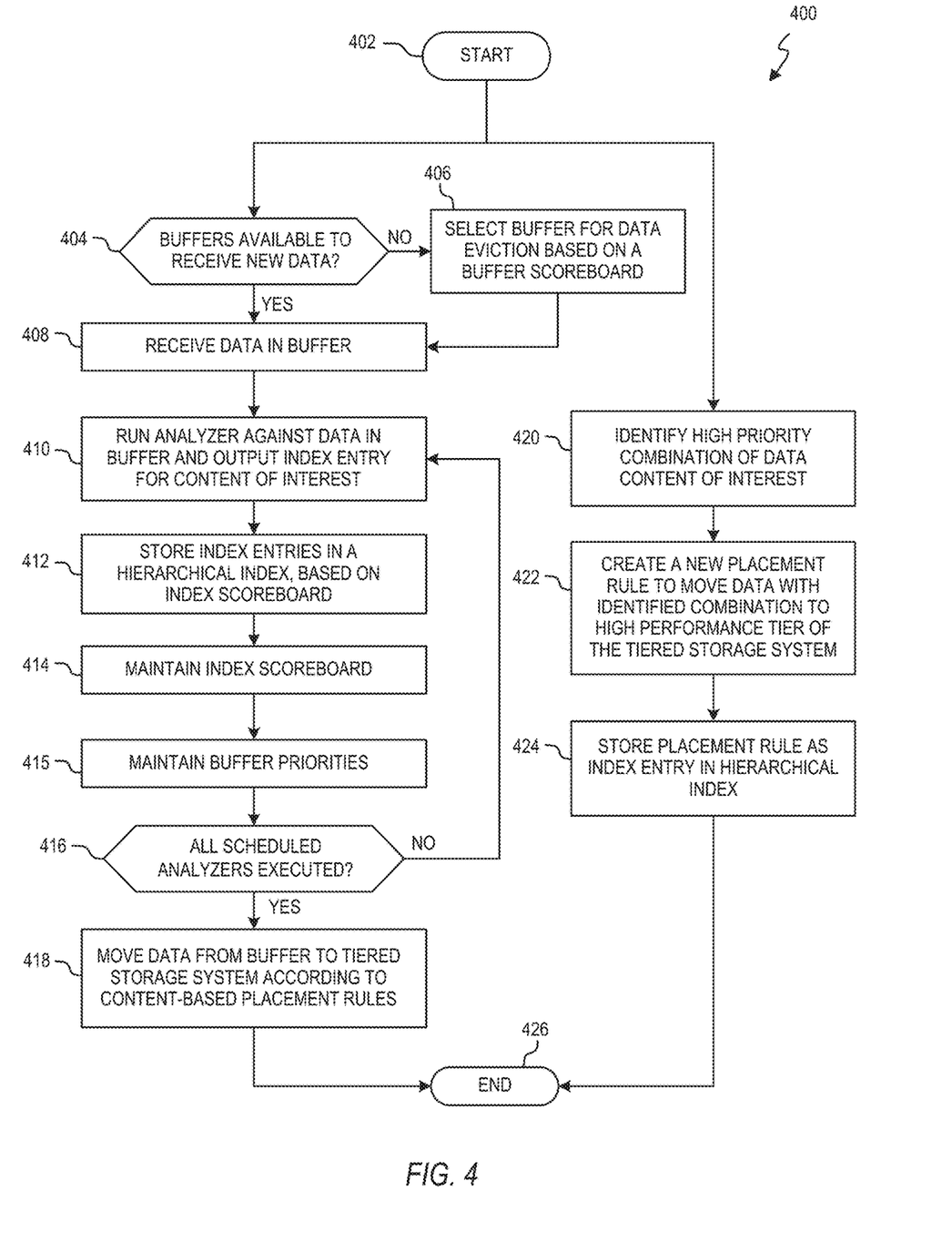
FIG. 4 is a flowchart of an example method for storing index entries in a hierarchical index, according to another implementation.

FIG. 4 is a flowchart of an example method 400 for storing index entries in a hierarchical index, according to another implementation. Method 400 may be implemented in the form of executable instructions stored on a machine readable storage medium and executed by at least one processor, and/or may be implemented in the form of electronic circuitry. As with method 300, method 400 may be executed or performed by the system 100 or any components thereof (including apparatus 101). In some implementations of the present disclosure, one or more blocks of method 400 may be executed substantially concurrently or in a different order than shown in FIG. 4. In some implementations of the present disclosure, method 400 may include more or less blocks than are shown in FIG. 4. In some implementations, one or more of the blocks of method 400 may, at certain times, be ongoing and/or may repeat.

The method 400 may begin at block 402, and continue to perform asynchronous processes. For example, the method 400 may include a process that includes blocks 404, 406, 408, 410, 412, 414, 415, 416, 418, and another process that includes blocks 420, 422, 424.

The process beginning at block 404 will first be described. At block 404, a buffer controller (e.g., 144) may check if any buffers (e.g., 102) are available to receive new data (e.g., 103). For example, a buffer may be available if it is not already holding data. If a buffer or buffers are available ("YES" at block 404), the available buffer receives incoming data 103 at block 408.

If insufficient buffers are available to receive new data ("NO" at block 404) because all or nearly all of the buffers 102 are already holding data, the method may proceed to block 406. At block 406, a priority manager 112, may select a buffer or buffers for data eviction (also referred to as buffer recycling) based on a buffer scoreboard (e.g., 142) that includes buffer priorities and counts of analyzers that have searched each of the buffers. For example, as described above with respect to FIG. 1, the priority manager 112 may select for data eviction a buffer having a lowest buffer priority according to the buffer scoreboard 142, and ties in priority may be broken by selecting the buffer with a larger count of analyzers. The buffer controller may move data out of the selected buffer and into a storage device, such as a tiered storage system (e.g., 122), thus freeing the selected buffer to receive new data at block 408. In some implementations, the buffer controller may move data into a tier of a tiered storage system according to placement rules, where some placement rules may differ for some data content of interest.

At block 410, an analyzer (e.g., 104 or 105) may run or execute against data received in the buffer at block 408, to identify or detect data content of interest in the data. An example analyzer may be a content recognizer. If the analyzer successfully identified or detected data content of interest, the analyzer may generate an index entry representing that data content of interest.

At block 412, the analyzer may store the index entry (e.g., 106) generated at block 410 in a hierarchical index (e.g., 108). More particularly, the hierarchical index may include indexing components having different performance levels (e.g., 110), and the analyzer may store the index entry in a particular one of the index components according to an index scoreboard (e.g., 114).

At block 414, the priority manager may maintain the index scoreboard based on predetermined policies (e.g., 116) that involve prioritization of data content of interest or functions that use data content of interest. In some implementations, the index scoreboard may be maintained with updates at block 412 in response to recently stored index entries or in response to changes in the system 100 (e.g., memory pressure may affect rules governing how fast certain index entries are moved to lower performance levels of the hierarchical index). In some implementations, the priority manager 112 may maintain the index scoreboard by moving existing index entries in the hierarchical index to different performance levels, based on a policies attached to those index entries in the index scoreboard.

At block 415, the priority manager may maintain a buffer scoreboard (e.g., 142). In some implementations, the buffer scoreboard may track buffer priorities of the buffers. In some implementations, buffer priority may be proportional to a highest priority among analyzers that have not yet searched that buffer for data content of interest. Moreover, the priority manager may update portions of the buffer scoreboard with new information based on execution of analyzers at block 410, which in turn may impact buffer priority (e.g., based on changes of the highest priority of unexecuted analyzers).

In some implementations, the apparatus 101 may include multiple analyzers that may execute against the buffer, either sequentially, in parallel, or in accordance with inter-analyzer priority dependencies. Execution of multiple analyzers may be managed or scheduled by a scheduler (e.g., 140). At block 416, if the scheduler determines that all scheduled analyzers have executed against the buffer ("YES" at block 416), control passes to 418. If the scheduler determines that scheduled analyzer(s) have yet to be executed against the buffer ("NO" at block 416), control may return to block 410 to continue executing the scheduled analyzer(s).

At block 418, a placement engine (e.g., 120) may move data from the buffer to the tiered storage system according to placement rules that prioritize data content of interest or functions that use data content of interest. In some implementations, the buffer controller may move data from multiple buffers to the tiered storage system at block 418. The placement rules may be similar in many regards to the placement rules described above with respect to FIG. 1.

The process including blocks 420, 422, 424 will now be described. At block 420, a post-processor (e.g., 130) may identify a high priority combination of data content of interest that co-exist in data. For example, the combinations of data content of interest may be identified from index entries in the hierarchical index or from data stored in the tiered storage system. In some implementations, the post-processor may include an association rule miner engine that implements at least some aspects of association rule mining to perform block 420, such as calculating support and/or confidence values for different combinations of data content of interest, although the post-processor may also employ other machine learning techniques, data mining techniques, etc.

At block 422, the post-processor may create a new placement rule to move data exhibiting the combination identified at block 420. For example, in some implementations, the new placement rule may prescribe moving data from a buffer to a high performance tier of the tiered storage system, by virtue of prominent combinations being deemed an important insight by a user, for example. At block 424, the post-processor or the priority manager may store the new placement rule created at block 422 as an index entry in the hierarchical index. In some implementations, the placement rule stored at block 424 may be used by blocks 406 and 418 when transferring data from buffer(s) to the tiered storage system.

After block 418 and block 424, the method may end at block 426. However, it should be understood that the method 400 may be repeated as new data is received as part of a data stream.

Figure 5:
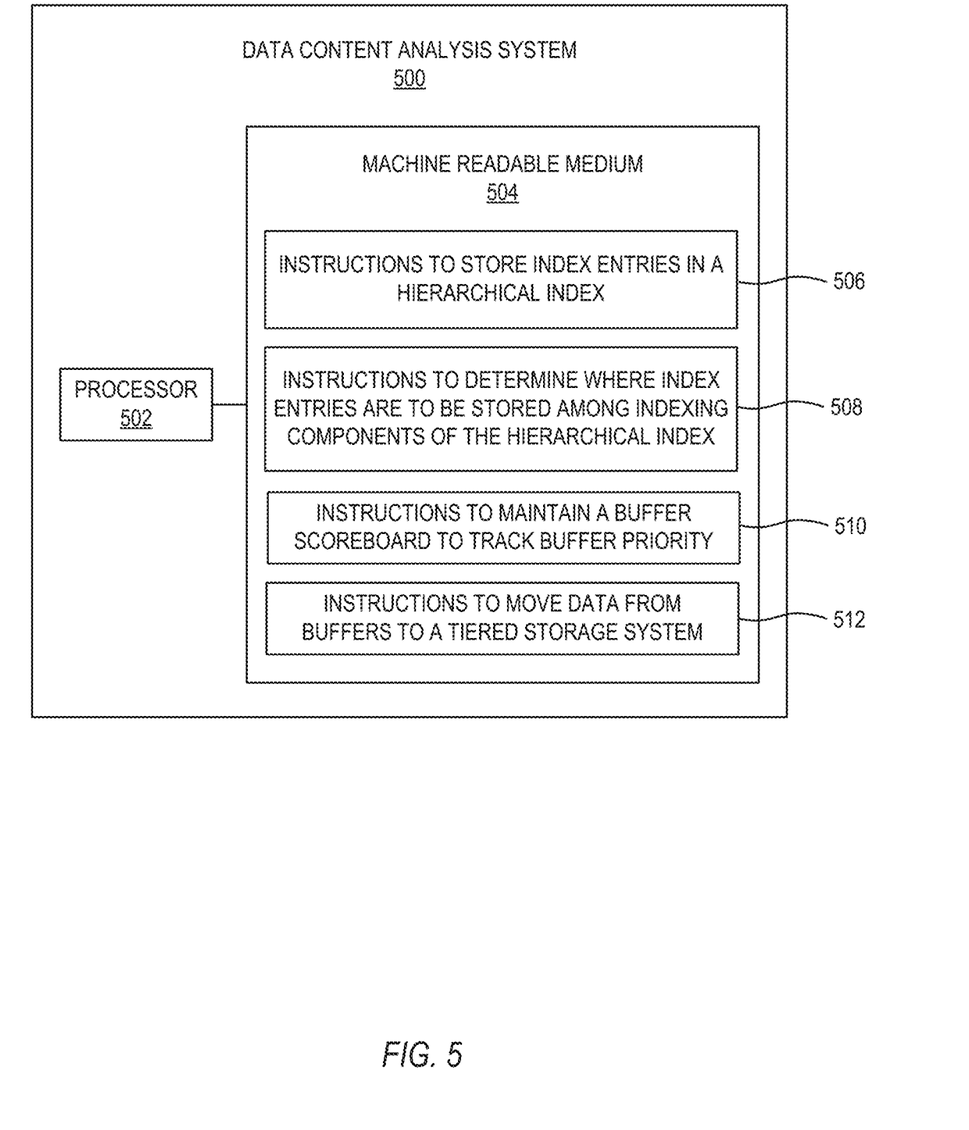
FIG. 5 is a block diagram of an example data content analysis system that includes a non-transitory, machine readable medium encoded with example instructions to store index entries in a hierarchical index.

FIG. 5 is a block diagram illustrating a data content analysis system 500 that includes a machine readable medium encoded with example instructions to store index entries in a hierarchical index. In some implementations, the data content analysis system 500 may serve as or form part of the apparatus 101 or, more generally, the system 100 in FIG. 1. In some implementations, the data content analysis system 500 may include at least one processor 502 coupled to a machine readable medium 504.

The processor 502 may include a single-core processor, a multi-core processor, an application-specific integrated circuit, a field programmable gate array, and/or other hardware device suitable for retrieval and/or execution of instructions from the machine readable medium 504 (e.g., instructions 506, 508, 510, 512) to perform functions related to various examples. Additionally or alternatively, the processor 502 may include electronic circuitry for performing the functionality described herein, including, but not limited to, the functionality of instructions 506, 508, 510, and/or 512. With respect to the executable instructions represented as boxes in FIG. 5, it should be understood that part or all of the executable instructions and/or electronic circuits included within one box may, in alternate implementations, be included in a different box shown in the figures or in a different box not shown.

The machine readable medium 504 may be any medium suitable for storing executable instructions, such as random access memory (RAM), electrically erasable programmable read-only memory (EEPROM), flash memory, hard disk drives, optical discs, or the like. In some example implementations, the machine readable medium 504 may be a tangible, non-transitory medium, where the term "non-transitory" does not encompass transitory propagating signals. The machine readable medium 504 may be disposed within the data content analysis system 500, as shown in FIG. 5, in which case the executable instructions may be deemed "installed" or "embedded" on the data content analysis system 500. Alternatively, the machine readable medium 504 may be a portable (e.g., external) storage medium, for example, that allows the data content analysis system 500 to remotely execute the instructions or download the instructions from the storage medium. In this case, the executable instructions may be part of an "installation package." As described further herein below, the machine readable medium 504 may be encoded with a set of executable instructions 506, 508, 510, 512.

Instructions 506, when executed by the processor 502, may store index entries in a hierarchical index with indexing components of different performance levels, the index entries representing data content of interest identified by analyzers executed against data in buffers. Instructions 508, when executed by the processor 502, may determine where index entries are to be stored among the indexing components of the hierarchical index, based on predetermined polices that involve prioritization of data content of interest or functions that use data content of interest. Instructions 510, when executed by the processor 502, may maintain a buffer scoreboard to track a buffer priority for each of the buffers. In some implementations, the buffer priority of each buffer may be proportional to a highest priority among analyzers that has not yet executed against the buffer. Instructions 512, when executed by the processor 502, may move data from the buffers to a tiered storage system according to placement rules related to data content of interest.

Figure 6:
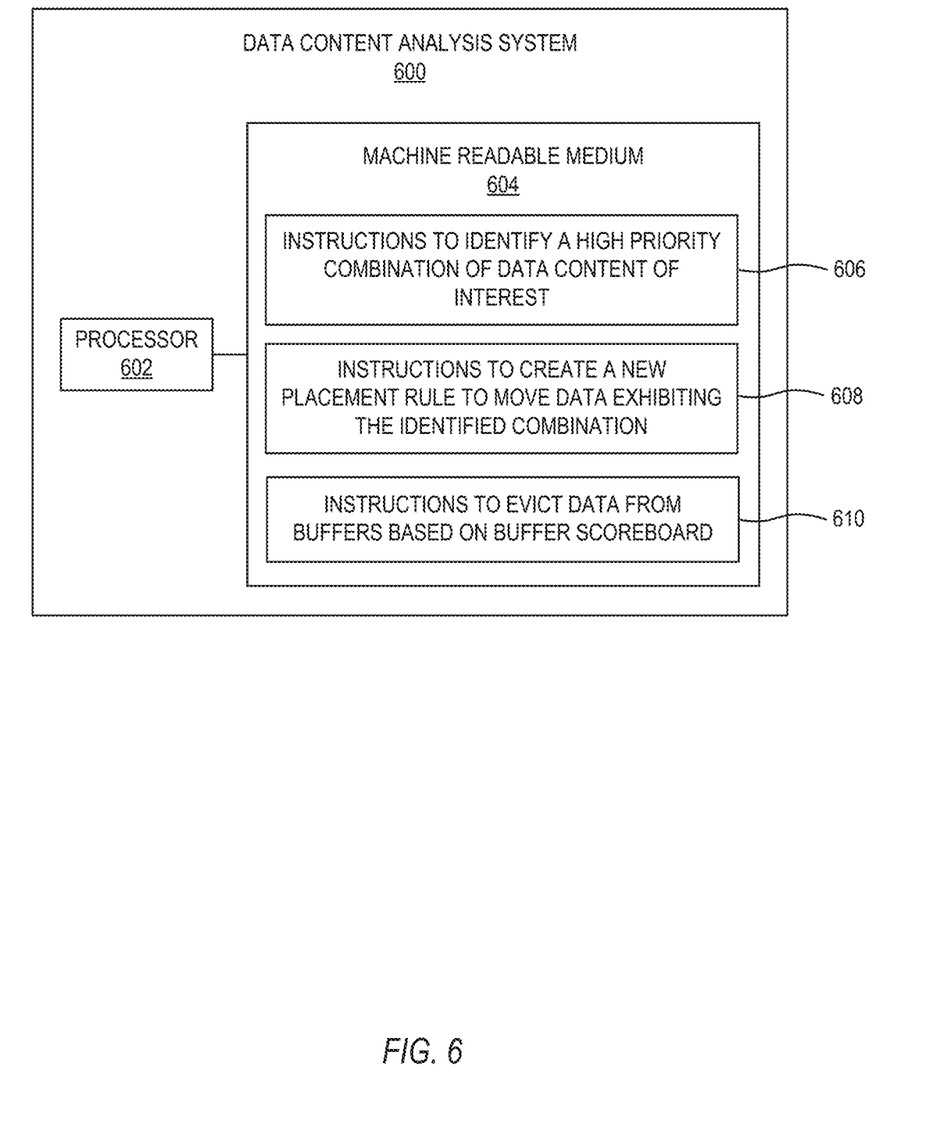
FIG. 6 is a block diagram of an example data content analysis system that includes a non-transitory, machine readable medium encoded with example instructions to create a new placement rule and to evict data.

FIG. 6 diagram of an example data content analysis system 600 that includes a machine readable medium encoded with example instructions to identify or create a new placement rule and to evict data. In some implementations, the data content analysis system 600 may serve as or form part of the apparatus 101 or, more generally, the system 100 in FIG. 1. The data content analysis system 600 includes a processor 602 and a machine readable medium 604, which may be analogous in many respects to the processor 602 and the machine readable medium 604, respectively. The machine readable medium 604 may be encoded with a set of executable instructions 606, 608, 610. Additionally or alternatively, the processor 602 may include electronic circuitry for performing the functionality described herein, including, but not limited to, the functionality of instructions 606, 608, 610.

Instructions 606, when executed by the processor 602, may identify a high priority combination of data content of interest that co-exist in data. For example, instructions 606 may include instructions to perform at least some parts of association rule mining to identify such combinations (e.g., by calculating support values and/or confidence values for different combinations of data content of interest). Instructions 608, when executed by the processor 602, may create a new placement rule to move data exhibiting the identified combination (e.g., identified by instructions 606) from a buffer to a high performance tier of the tiered storage system. Instructions 610, when executed by the processor 602, may evict data from the buffers based on a buffer scoreboard.

Figure 7:
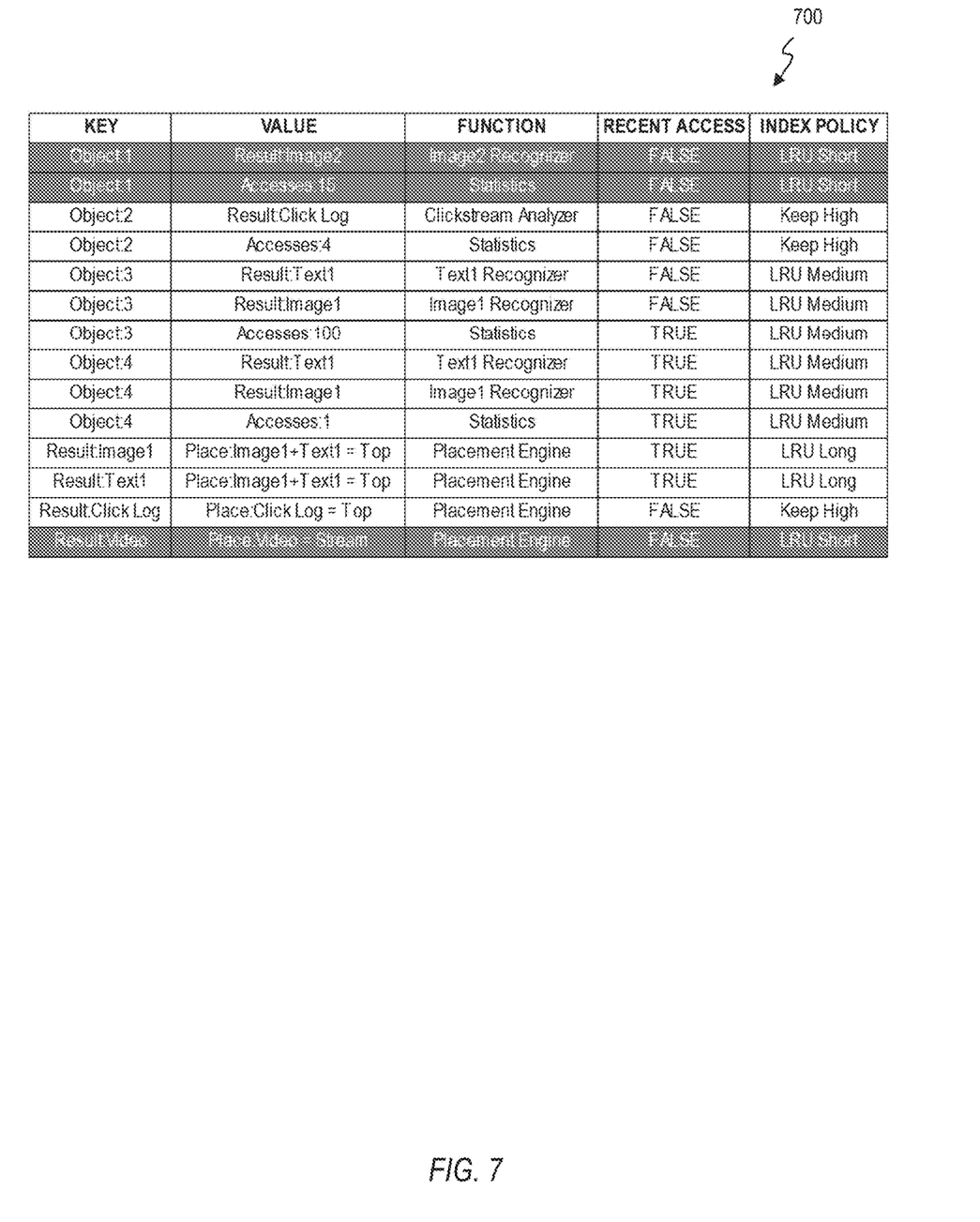
FIG. 7 illustrates example index contents of a hierarchical index, according to an example implementation.

FIG. 7 illustrates example index contents 700 of a hierarchical index (e.g., 108) according to one example implementation. As will be described below, the index contents 700 may include index entries (e.g., 106, included directly or included indirectly by mapping, pointers, etc.) and index scoreboard information (e.g., 114). FIG. 7 may illustrate index contents 700 used by a system in the context of an interactive web content store, such as a bldg. The system may include analyzers or analytics sub-engines, such as a clickstream analyzer that identifies content representing web users' actions (deemed to be very valuable for immediate application decision making by a user, in this example), an image1 recognizer that recognizes pictures of food, an image2 recognizer that recognizes pictures of kittens, a video recognizer that recognize videos of crowds, and a text1 recognizer that recognizes positive comments about food.

In the index contents 700, information in the Key column includes a key type (e.g., "Object" or "Result" in FIG. 7) paired with an identifier number. An "Object" key type may indicate that the row relates a set of buffered data for which a related index entry was generated. A "Result" key type may indicate that an action (e.g., a placement action) is to be triggered if a recognizer detects the paired value.

In the index contents 700, information in the Value column includes a value type (e.g., "Result", "Accesses", "Place" in FIG. 7) paired with a value. The value type may reflect a function that either generated the value or a function that can use the value. For example, a "Result" value type may refer to an insight generated by an analytics engine and stored as an index entry in a hierarchical index, an "Accesses" value type may refer to insight into a number of accesses of a data stored as an index entry in the hierarchical index, and a "Place" value type may refer to a placement rule stored in the hierarchical index. The Key and Value columns may represent or map to index entries (e.g., 106) stored in a hierarchical index (e.g., 108), or alternatively, the Key and Value columns may be the index entries (e.g., 106) themselves.

In the index contents 700, information in the Function column indicates the function that either generated the value (e.g., "Image1 Recognizer", "Image2 Recognizer", "Text1 Recognizer", "Clickstream Analyzer", "Statistics" in FIG. 7) or a function that can use the value (e.g., "Placement Engine" in FIG. 7). Information in the Recent Access column indicates whether the Value was recently accessed or the Function was recently used. Information in the Index Policy column sets forth the policy by which an index entry (e.g., 106) corresponding to that row of the index contents 700 will be placed in the hierarchical index. For example, a Least Recently Used (LRU) policy may be used to move or demote index entries that have not been accessed recently to a lower performance level of the hierarchical index (i.e., the "aging" process discussed above with respect to policies 116). In some implementations, the Function column and the Recent Access column may form aspects of an index scoreboard (e.g., 114). In some implementations, the Index Policy column also may form an aspect of the index scoreboard (e.g., 114), and may be derived from or represent predetermined policies (e.g., 116) encoded in a priority manager (e.g., 112).

In the present illustration, the index contents 700 indicates that Object 1 was recognized as an image of a kitten with 15 accesses, Object 2 is a clickstream log, and both Objects 3 and 4 were recognized as containing positive text and images of food. Object 3 was accessed 100 times, and Object 4 has not been accessed much.

The rows of the index contents 700 with "Result" Key types are placement rules to be effected by a Placement Module as noted in the Function column (such as placement engine 120). Specifically, the rows with "Place:Image1+Text1=Top" Value type illustrate a high priority combination of positive text comments and images of food, discovered by association rule mining, for example. The placement rule may trigger the placement engine to place data containing such a combination in a "Top" or highest performance tier of a tiered storage system (e.g., 122) for faster read access. For example, such a placement rule may apply to Object 4, even though Object 4 has not been accessed often yet.

The row of the index contents 700 with "Place:Click Log=Top" Value type may be a rule established when the system was configured by a user, which indicates that all click logs generated by a clickstream analyzer should trigger placement in a high performance tier of a tiered storage system. The row with "Place:Video=Stream" is a placement rule for video content identified by the video recognizer.

The index contents 700 may be managed by a priority manager (e.g., 112) according to the following example policies. Index entries related to certain data content of interest should be kept at a highest performance level of the hierarchical index (e.g., Object 2, a click log, is kept "high" in the present illustration). Index entries may be moved over time to a low performance level index of the hierarchical index, where index entries are moved over a short time period by default unless overridden by other policies. For example, the "Place:Video=Stream" placement rule may age according to a default quick aging rule (LRU short), whereas the "Place:Image1+Text1=Top" placement rule may age with a long LRU time frame because discovered combinations are deemed important by the user. Index entries for objects related to important placement rules may move to a low performance level over a medium time frame (e.g., Objects 3 and 4 have LRU Medium aging because they are related to important placement rules). According to the foregoing policies, shaded entries in the contents 700, namely the entries with Keys "Object:1" and "Result:Video" have been aged or moved to a lower performance level of the hierarchical index.

In view of the foregoing description, it can be appreciated that analytic processing of a data stream, such as content recognition, may be accelerated by storing index entries generated by the analytic processing in a an appropriate performance level of an hierarchical index based on the content of the data stream detected by the analytic processing. Moreover, high value data that has data content of interest or combinations of data content of interest may be discovered in time to place that high value data in a high performance portion of a tiered storage system. In some cases, the systems and techniques described above may be deemed to be data content driven implementations for biasing information and data placement in hierarchical indexing systems and tiered storage systems.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. An apparatus comprising:
   buffers to receive data;
   a processor; and
   a non-transitory storage medium storing instructions executable on the processor to:
   identify data content of interest from the data in the buffers and to store index entries representing the identified data content of interest in a hierarchical index having indices of different performance levels; and
   maintain an index scoreboard that tracks where the index entries are to be stored among the indices of the different performance levels of the hierarchical index based on policies that prioritize functions that use the identified data content of interest, wherein the policies specify that:
   a first index entry for first data content of interest used by a first function having a first priority is stored in a first index of a first performance level in the hierarchical index, and
   a second index entry for second data content of interest used by a second function having a second priority is stored in a second index of a second performance level in the hierarchical index, wherein the first priority is higher than the second priority, and the first performance level is higher than the second performance level.

2. The apparatus of claim 1, wherein the instructions are executable on the processor to apply the policies to:
   keep first index entries related to a first type of data content of interest in a first performance level index of the hierarchical index; and
   move the first index entries over time to a second performance level index of the hierarchical index, wherein the second performance level index has a lower performance level than the first performance level index.

3. The apparatus of claim 1, wherein the non-transitory storage medium further comprises placement instructions executable on the processor to move data from the buffers to a tiered storage system according to placement rules that prioritize data content of interest or the functions that use data content of interest.

4. The apparatus of claim 3, wherein the placement rules are stored as index entries in the hierarchical index.

5. The apparatus of claim 1, wherein the instructions comprise an analytics engine including a plurality of analytics sub-engines, each of the plurality of analytics sub-engines to search for different data content of interest from the data in the buffers and at least some of the plurality of analytics sub-engines being prioritized, and
wherein the instructions are executable on the processor to:
maintain a buffer scoreboard to track a buffer priority of each of the buffers, a buffer priority of a respective buffer of the buffers is associated with a highest priority among analytics sub-engines that have not yet executed against the respective buffer, and
approve data eviction for a buffer based on the buffer scoreboard.

6. The apparatus of claim 1, further comprising an analytics engine scheduler, wherein:
the instructions comprise an analytics engine including a plurality of analytics sub-engines, each of the plurality of analytics sub-engines to search for different data content of interest from the data in the buffers and to store an index entry generated by a successful search in the hierarchical index, and
the analytics engine scheduler is to prioritize execution of the plurality of analytics sub-engines against the buffers based on a prioritization of the analytics sub-engines that dynamically adjusts based on success rates of respective analytics sub-engines of the plurality of analytics sub-engines.

7. The apparatus of claim 6, wherein an adjustment of a priority of a first analytics sub-engine of the plurality of analytics sub-engines causes a corresponding adjustment of a priority of a second analytics sub-engine of the plurality of analytics sub-engines.

8. The apparatus of claim 1, further comprising:
a post-processor to discover a pattern in data of the index entries stored in the hierarchical index, and store information of the pattern in a given index entry of the hierarchical index, and
wherein the instructions are executable on the processor to:
analyze new data received in a buffer of the buffers;
generate, based on the analyzing, a new index entry; and
evaluate the new index entry against the given index entry representing the pattern, to determine whether the new data has the pattern.

9. The apparatus of claim 1, wherein the index scorecard comprises, for a given index entry of the index entries, a name of a function that generated the given index entry, and a policy of the policies to be applied to the given index entry.

10. The apparatus of claim 1, wherein the instructions comprise an analytics engine including a plurality of analytics sub-engines to process the data in the buffers, and wherein the instructions are executable on the processor to:
detect that the buffers are becoming full; and
identify a first buffer of the buffers from which data is to be evicted based on which analytics sub-engines are scheduled to execute against the data in the first buffer.

11. A method performed by a system comprising a processor, comprising:
searching data in buffers, by a plurality of prioritized analyzers, for data content of interest;
storing index entries in a hierarchical index comprising indexing components of different performance levels, the index entries representing the data content of interest identified by the searching;
maintaining, by a priority manager, an index scoreboard that indicates where the index entries are to be stored among the indexing components based on policies that involve prioritization of the data content of interest or functions that use the data content of interest; and
maintaining, by the priority manager, buffer priorities of the buffers, each respective buffer priority of the buffer priorities being proportional to a highest priority among analyzers that have not yet searched a corresponding buffer for data content of interest, wherein a first buffer of the buffers has a first buffer priority responsive to a first analyzer priority of a first analyzer scheduled to search data in the first buffer, and a second buffer of the buffers has a second buffer priority responsive to a second analyzer priority of a second analyzer scheduled to search data in the second buffer, and wherein the first buffer priority is higher than the second buffer priority, and the first analyzer priority is higher than the second analyzer priority.

12. The method of claim 11, further comprising moving data from the buffers to a tiered storage system according to placement rules that prioritize the data content of interest or the functions that use the data content of interest.

13. The method of claim 11, further comprising selecting a buffer for data eviction when insufficient buffers are available to receive new data, the selecting based on a buffer scoreboard that includes the buffer priorities and counts of the analyzers that have searched the buffers.

14. The method of claim 11, wherein the policies specify that:
a first index entry for first data content of interest used by a first function having a first priority is stored in a first index component of a first performance level in the hierarchical index, and
a second index entry for second data content of interest used by a second function having a second priority is stored in a second index component of a second performance level in the hierarchical index, wherein the first priority is higher than the second priority, and the first performance level is higher than the second performance level.

15. A non-transitory machine readable medium storing instructions that upon execution cause a system to:
store index entries in a hierarchical index having indexing components of different performance levels, the index entries representing data content of interest identified by analyzers executed against data in buffers;
determine where the index entries are to be stored among the indexing components of the hierarchical index, based on policies that involve prioritization of the data content of interest or functions that use the data content of interest;
maintain a buffer scoreboard to track a buffer priority of each of the buffers, the buffer priority of each respective buffer being proportional to a highest priority among analyzers that have not yet executed against the respective buffer, wherein a first buffer of the buffers has a first buffer priority responsive to a first analyzer priority of a first analyzer scheduled to search data in the first buffer, and a second buffer of the buffers has a second buffer priority responsive to a second analyzer priority of a second analyzer scheduled to search data in the second buffer, and wherein the first buffer priority is higher than the second buffer priority, and the first analyzer priority is higher than the second analyzer priority; and move data from the buffers to a tiered storage system according to placement rules related to the data content of interest.

16. The non-transitory machine readable medium of claim 15, wherein the policies specify that:

a first index entry for first data content of interest used by a first function having a first priority is stored in a first index component of a first performance level in the hierarchical index, and a second index entry for second data content of interest used by a second function having a second priority is stored in a second index component of a second performance level in the hierarchical index, wherein the first priority is higher than the second priority, and the first performance level is higher than the second performance level.

17. The non-transitory machine readable medium of claim 15, wherein the instructions upon execution cause the system to:

discover a pattern in data of the index entries stored in the hierarchical index, and store information of the pattern in a given index entry of the hierarchical index;

analyze new data received in a buffer of the buffers;

generate, based on the analyzing, a new index entry; and evaluate the new index entry against the given index entry representing the pattern, to determine whether the new data has the pattern.

18. The non-transitory machine readable medium of claim 15, wherein the determining of where the index entries are to be stored among the indexing components of the hierarchical index is based on an index scorecard, and wherein the index scorecard comprises, for a given index entry of the index entries, a name of a function that generated the given index entry, and a policy of the policies to be applied to the given index entry.

19. The non-transitory machine readable medium of claim 15, wherein the instructions upon execution cause the system to:

detect that the buffers are becoming full; and identify a first buffer of the buffers from which data is to be evicted based on priorities of the analyzers scheduled to execute against the data in the first buffer.

* * * * *